(12) United States Patent
Sowden

(10) Patent No.: US 9,157,372 B2
(45) Date of Patent: Oct. 13, 2015

(54) SERIES BATTERY START CONTROLLER

(71) Applicant: Bell Helicopter Textron Inc., Fort Worth, TX (US)

(72) Inventor: Chandler Sowden, North Richland Hills, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 289 days.

(21) Appl. No.: 13/794,200

(22) Filed: Mar. 11, 2013

(65) Prior Publication Data

US 2014/0250909 A1    Sep. 11, 2014

(51) Int. Cl.
*H02J 7/00* (2006.01)
*H02J 7/14* (2006.01)
*F02C 7/266* (2006.01)
*H02J 1/00* (2006.01)
*F02N 11/08* (2006.01)
*F02C 7/26* (2006.01)
*F02C 7/262* (2006.01)
*H02P 9/08* (2006.01)
*F02C 7/275* (2006.01)

(52) U.S. Cl.
CPC . *F02C 7/266* (2013.01); *F02C 7/26* (2013.01); *F02C 7/262* (2013.01); *F02C 7/275* (2013.01); *F02N 11/087* (2013.01); *F02N 11/0866* (2013.01); *H02J 1/00* (2013.01); *H02P 9/08* (2013.01); *F02N 2011/0877* (2013.01); *F05D 2220/329* (2013.01); *Y10T 307/653* (2013.01)

(58) Field of Classification Search
CPC ............. H02J 7/0024; H02J 1/00; F02C 7/266
USPC .................................. 320/117, 121, 116, 104
See application file for complete search history.

(56) References Cited

U.S. PATENT DOCUMENTS

| | | | |
|---|---|---|---|
| 3,793,825 A | 2/1974 | Dickhart et al. | |
| 4,007,970 A * | 2/1977 | Romero | 303/126 |
| 4,181,945 A * | 1/1980 | Adler et al. | 701/117 |
| 5,697,552 A * | 12/1997 | McHugh et al. | 236/78 B |
| 6,023,109 A * | 2/2000 | Yang | 307/81 |
| 6,134,875 A | 10/2000 | Massey | |
| 6,268,711 B1 * | 7/2001 | Bearfield | 320/117 |
| 2010/0147354 A1 * | 6/2010 | Takehara et al. | 136/244 |
| 2010/0250018 A1 * | 9/2010 | Hauf et al. | 700/297 |
| 2011/0001456 A1 * | 1/2011 | Wang | 320/117 |
| 2012/0313437 A1 * | 12/2012 | Latham | 307/65 |
| 2013/0320926 A1 * | 12/2013 | Kerfoot et al. | 320/117 |

OTHER PUBLICATIONS

European Search Report issued in European Application No. 14153240.8 on Jun. 6, 2014, 3 pages.
Communication pursuant to Article 94(3) EPC issued in European Application No. 14153240.8 on Jun. 27, 2014, 4 pages.

* cited by examiner

*Primary Examiner* — M'Baye Diao
(74) *Attorney, Agent, or Firm* — Fish & Richardson P.C.

(57) ABSTRACT

A series battery start controller for starting an aircraft turbine engine and method thereof is provided, wherein the battery series start controller connects two batteries in series when an aircraft engine starter is engaged to provide a higher voltage to start the aircraft engine and to provide adequate operational voltage to aircraft engine instruments and other aircraft electrical systems, and wherein the battery series start controller reconnects the batteries in parallel when the electrical load drawn by the starting aircraft engine decreases and the supplied voltage to the aircraft rises to a predetermined threshold.

22 Claims, 3 Drawing Sheets

SERIES BATTERY START CONTROLLER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Starting an aircraft turbine engine places an immense load on the electrical system of an aircraft, which often leads to an inadequate voltage supplied to the aircraft engine instruments and other aircraft systems. One solution is to use dual batteries to produce double voltage to improve starting performance; however, this requires a complex multiple-bus switching scheme to prevent the excess voltage needed to start an aircraft engine from reaching the engine instruments and other aircraft systems. Another current solution involves utilizing additional battery capacity to power the engine instruments during engine startup. Both existing solutions are quite complex, and the use of additional battery capacity results in unwanted excess weight on the aircraft. Accordingly, there is a need for a simplified solution to aircraft turbine engine startup that does not deprive the aircraft engine instruments and other aircraft systems from adequate voltage during engine startup.

SUMMARY

In some embodiments of the disclosure, an apparatus is disclosed as comprising: a series switching logic, a relay control switch electrically coupled to the series switching logic, and a series-parallel relay electrically coupled to the relay control switch, wherein the series-parallel relay is configured to selectively configure a plurality of batteries between a series and parallel connection.

In other embodiments of the disclosure, an apparatus is disclosed as comprising: a series switching logic configured to receive an input signal, wherein when the series switching logic receives the input signal, the series switching logic transmits an output signal; a relay control switch configured to receive the output signal from the series switching logic and configured to activate a series-parallel relay, wherein when the output signal from the series switching logic is received, the relay control switch activates the series-parallel relay that configures a first battery and a second battery into a series connection; and a cutoff switch configured to detect an operating voltage, wherein when the operating voltage reaches a predetermined cutoff voltage, the cutoff switch terminates the output signal from the series switching logic and the first battery and the second battery are then reconfigured into a parallel connection.

In yet other embodiments of the disclosure, a method of starting an engine is disclosed as comprising: receiving an input signal from an engine starting device; switching a first battery and a second battery configuration from a parallel connection to a series connection; and transmitting a voltage from the series connection of the first battery and the second battery to an engine starter.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to provide a series battery start controller in an engine starting system, such as, but not limited to, an aircraft turbine engine starting system. For example, in cases where engine startup places a significant load on an electrical system, thereby depriving engine instruments and other electrical systems of proper operating voltage, it may be desirable to utilize a series battery start controller to configure two batteries in series during engine startup to accommodate the electrical load required to start an engine and then reconfigure the two batteries in parallel once the electrical load decreases and the operating voltage rises to a predetermined threshold. In some embodiments of the disclosure, systems and methods are disclosed that comprise starting an engine, wherein a series battery controller receives an input signal from an engine starting system, wherein the series battery start controller sends a signal to a series-parallel relay to configure two batteries in a series connection to provide a higher voltage during initial engine startup, and wherein the two batteries are then reconfigured into a parallel connection when the operating voltage reaches a predetermined threshold voltage as determined by the characteristics of the series battery start controller.

Figure 1:
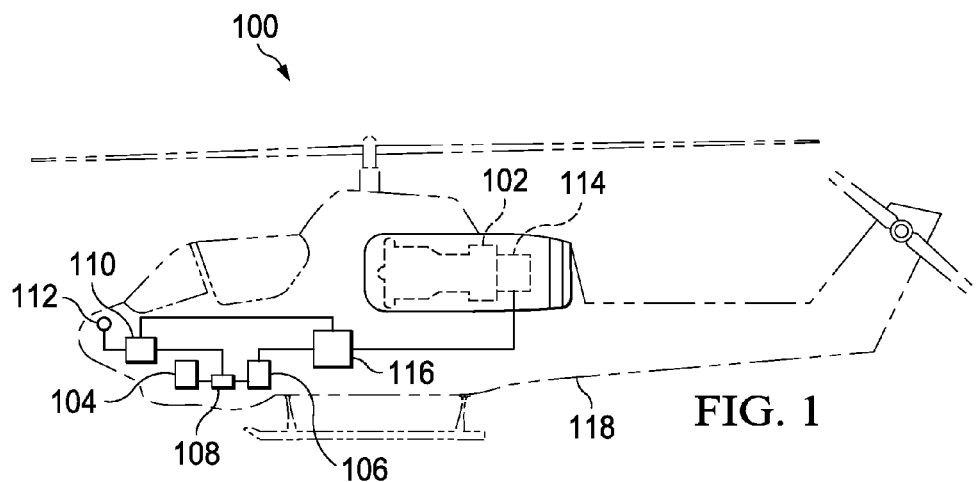
FIG. 1 is a side partial cutaway view of an aircraft according to an embodiment of the disclosure.

Referring to FIG. 1, an orthogonal side view of an aircraft 100 is shown according to an embodiment of the disclosure. It should be understood that while the aircraft 100 example depicted comprises a helicopter, embodiments of the disclosure are not limited to any particular setting or application, and embodiments may be used in any setting or application requiring the control of a plurality of batteries during engine startup. For example, the systems and methods described herein could be applied to airplanes, tilt-rotor aircraft, or any type of vehicle or piece of equipment, particularly those with turbine or other slow-start engines. An aircraft 100 generally comprises a fuselage 118 and at least one engine 102 (e.g. a turbine or piston engine). In some embodiments of the disclosure, the aircraft 100 may comprise a single engine 102. In other embodiments, the aircraft 100 may comprise more than one engine 102. Each engine 102 of an aircraft 100 generally comprises an engine starter 114 coupled to the engine 102 and that supplies the torque and rotation necessary to start the engine 102. An engine starter 114 may generally be coupled to a first battery 106 through a battery relay 116. In some embodiments, the engine starter 114 may be coupled to a first battery 104 and a second battery 106 through a battery relay 116. In some embodiments of the disclosure, a first battery 104 and a second battery 106 may generally be coupled by a series-parallel relay 108.

Still referring to FIG. 1, an aircraft 100 may also comprise a battery start controller 110. In some embodiments, the battery start controller 110 may generally be coupled to an engine start switch 112. In other embodiments of the disclosure, wherein the aircraft 100 comprises more than one engine 102, the battery start controller 112 may comprise an engine start switch 112 directed to each respective engine 102. The battery start controller 110 may generally also be coupled to a battery relay 110. Additionally, the battery start controller 110 may also be coupled to a series-parallel relay 108, wherein the battery start controller 110 provides control over the series-parallel relay 108, the series-parallel relay 108 having the capability of switching the configuration of a first battery 104 and a second battery 106 into a series connection or a parallel connection. In some embodiments of the disclosure, the series-parallel relay 108 may generally configure a first battery 104 and a second battery 106 in a parallel connection at normal operating conditions, while the battery start controller 110 may signal the series-parallel relay 108 to configure the first battery 104 and the second battery 106 in a series connection during engine startup. The series connection of the first battery 104 and the second battery 106 may provide about twice the voltage generally utilized to start an engine 102 in an aircraft 100. Thus, in some embodiments of the disclosure, the operating voltage supplied by the series connection of the first battery 104 and the second battery 106 may be as high as forty-eight (48) volts, e.g. when using two twenty-four (24) volt batteries.

Figure 2:
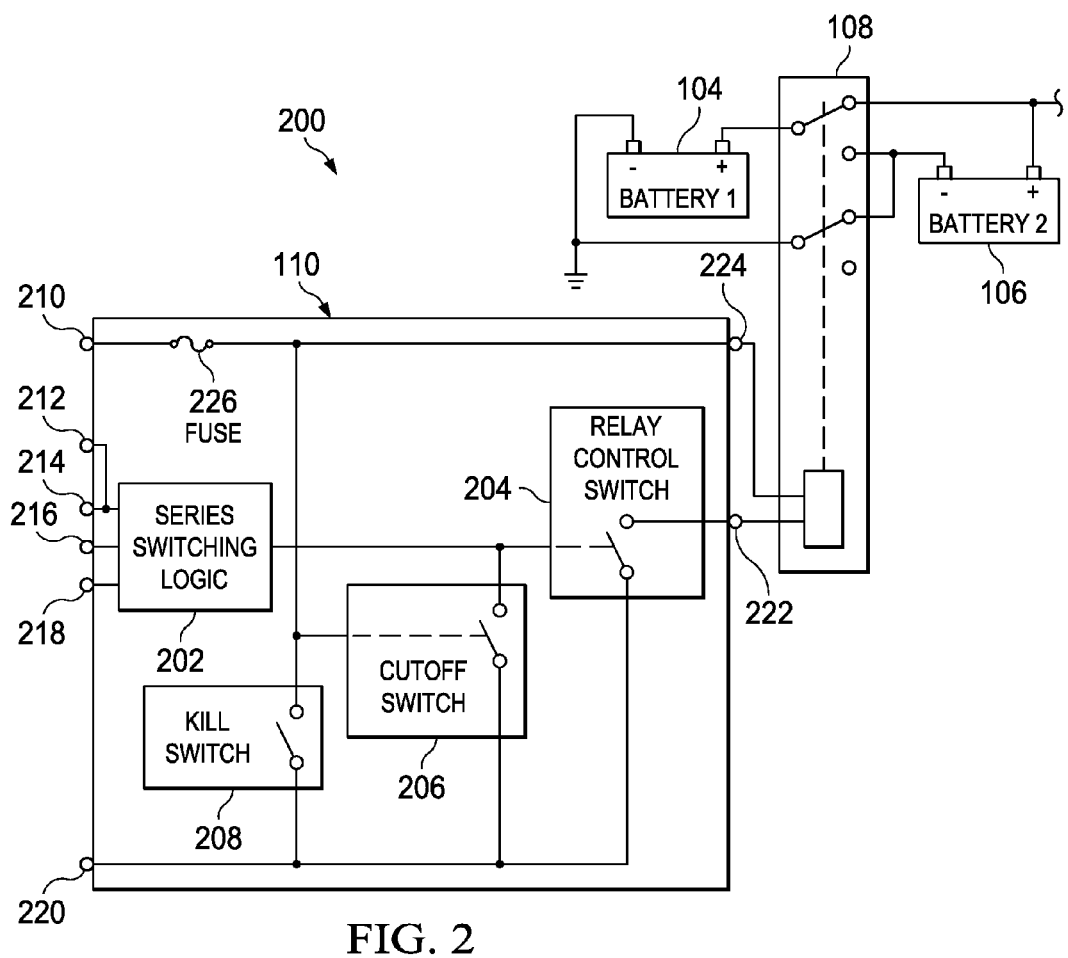
FIG. 2 is a diagram of an engine starting system comprising a series battery start controller according to an embodiment of the disclosure.

Referring now to FIG. 2, a diagram of an engine starting system 200 comprising a series battery start controller 110 is shown according to an embodiment of the disclosure. The engine starting system 200 may generally comprise a battery start controller 110, a series-parallel relay 108, a first battery 104, and a second battery 106. In some embodiments of the disclosure, a series-parallel relay 108 may be coupled to a first battery 104 and a second battery 106, wherein the series-parallel relay 108 may be configured to selectively configure the first battery 104 and the second battery 106 between a series and parallel connection. It should be noted that the series-parallel relay 108 may generally configure the first battery 104 and the second battery 106 into a parallel connection during steady state operation, wherein steady state operation includes all aircraft operation with the exception of engine startup. In some embodiments of the disclosure, the operating voltage of the aircraft 100 while the series-parallel relay 108 configures the first battery 104 and the second battery 106 into a parallel connection during the steady state operation may nominally be about twenty-eight (28) volts.

The battery start controller 110 may generally comprise a series switching logic 202, a relay control switch 204, a cutoff switch 206, and a kill switch 208. The battery start controller 110 may also comprise a plurality of inputs and outputs. In some embodiments, the battery start controller 110 may comprise a battery relay input 210 to provide power to the battery start controller 110. The battery start controller 110 may also comprise a battery relay output 224, coupled to the battery relay input 210. The battery relay output 224 may also be coupled to the series-parallel relay 108 to provide power to the series-parallel relay 108. In some embodiments of the disclosure, the battery series controller 110 may comprise a fuse 226, wherein the fuse 226 may be located internally to the battery start controller 110 between the battery relay input 210 and the battery relay output 224. In other embodiments, a fuse 226 may be located external to the battery start controller 110. It will also be appreciated by one skilled in the art that a fast-acting circuit breaker could be used in lieu of the fuse 226.

The battery start controller 110 may also comprise a plurality of inputs coupled to the series switching logic 202. In some embodiments, the battery start controller 110 may comprise a first engine start input 212 coupled to the series switching logic 202. In other embodiments of the disclosure, the battery start controller 110 may comprise a plurality of engine start inputs for embodiments comprising more than one engine 102, including a first engine start input 212 and a second engine start input 214 coupled to the series switching logic 202. In some embodiments of the disclosure, the first engine input 212 and the second engine input 214 may be coupled in parallel configuration. In some embodiments of the disclosure, the series switching logic 202 may be configured to receive an input signal from an engine start switch 112 sent to the first engine start input 212 and/or the second engine start input 214, wherein when an input signal is received, the series switching logic 202 transmits an output signal to the relay control switch 204.

The battery start controller 110 may also comprise a generator input 216 coupled to the series switching logic 202 and that is configured to detect the presence of a generator connected to an aircraft 100. In some embodiments of the disclosure, the series switching logic 202 may be configured to detect the presence of a generator connected to an aircraft 100, such that when a generator is detected, the series switching logic 202 is precluded from transmitting an output signal to the relay control switch 204. In some embodiments, the generator input 216 may be configured to detect the presence of an operating on-board generator. While the term generator is used in this embodiment, the disclosure should not be limited to this embodiment. Thus, a generator may comprise any equipment capable of producing electrical power to power an aircraft 100 as would be appreciated by one skilled in the art.

Furthermore, the battery start controller 110 may also comprise an external power input 218 coupled to the series switching logic 202 and that is configured to detect the presence of an external power source connected to an aircraft 100. In some embodiments of the disclosure, the series switching logic 202 may be configured to detect the presence of an external power source connected to an aircraft 100, such that when an external power source is detected, the series switching logic 202 is precluded from transmitting an output signal to the relay control switch 204. As used in this embodiment, an external power source may include a hard-wired electrical connection, a generator, or any other capable means of sustaining the electrical demands of an aircraft 100 as would be appreciated by one skilled in the art. Generally, the generator input 216 and/or the external power input 218 may comprise a fail-safe built in to the series switching logic 202 to prevent the first battery 104 and the second battery 106 from being configured into a series connection. Because a generator connected to the generator input 216 or external power source connected to the external power input 218 generally provides adequate power to start an aircraft 100, by detecting the existence of any external power source, the series switching logic effectively prevents a voltage overload that may damage the engine instruments or other electrical systems of an aircraft 100.

Still referring to FIG. 2, the battery start controller 110 may also comprise a relay control switch 204. The relay control switch 204 may generally be coupled to the series switching logic 202. The relay control switch 204 may also be coupled to the series-parallel relay through a series-parallel relay output 222 of the battery start controller 110. According to some embodiments of the disclosure, the relay control switch 204 may be configured to receive an output signal from the series switching logic 202, wherein when the relay control switch 204 receives the output signal from the series switching logic 202, the relay control switch may activate the series-parallel relay 108 via the series-parallel relay output 222 of the battery start controller 110 to configure the first battery 104 and the second battery 106 into a series connection. In some embodiments of the disclosure, the relay control switch 204 may also be coupled to a ground terminal 220 of the battery start controller 110. While a ground terminal 220 is provided in this embodiment, it should be understood that a ground terminal should not be limited to any particular embodiment, and a ground terminal may include a ground plane, direct chassis ground, or any other means of grounding an electrical connection as would be appreciated by one skilled in the art.

The battery start controller 110 may also comprise a cutoff switch 206. The cutoff switch 206 may generally be coupled to the series switching logic 202 and the relay control switch 204 at a terminal between the series switching logic 202 and the relay control switch 204. In some embodiments of the disclosure, the relay control switch 206 may also be coupled to the battery relay input 210 at a terminal between the battery relay input 210 and the battery relay output 224. According to some embodiments of the disclosure, the cutoff switch 206 may be configured to detect an operating voltage of an aircraft 100 as measured at the terminal of the cutoff switch 206 and the battery relay input 210. The cutoff switch 206 may also be configured to terminate an output signal transmitted by the series switching logic 202 to the relay control switch 204, wherein when the operating voltage reaches or exceeds a predetermined cutoff voltage, the cutoff switch 206 operates to reconfigure the first battery 104 and the second battery 106 into a parallel connection. In some embodiments of the disclosure, the predetermined cutoff voltage may be about twenty-nine (29) volts as determined by the characteristics of the circuit. It should be noted that the predetermined cutoff voltage of the cutoff switch 206 may be configured based on any number of criteria and in some embodiments may be a percentage of a battery voltage (e.g. 130%) or may be chosen based on the startup characteristics of an engine 102. In some embodiments of the disclosure, the cutoff switch 206 may also be coupled to a ground terminal 220 of the battery start controller 110. While a ground terminal 220 is provided in this embodiment, it should be understood that a ground terminal should not be limited to any particular embodiment, and a ground terminal may include a ground plane, direct chassis ground, or any other means of grounding an electrical connection as would be appreciated by one skilled in the art.

Still referring to FIG. 2, the battery start controller 110 may also comprise a kill switch 208. The kill switch 208 may be generally coupled to the cutoff switch 206 at a terminal between the cutoff switch 206 and the battery relay input 210. In some embodiments of the disclosure, the kill switch 208 may be configured to detect an operating voltage of an aircraft 100 as measured at the terminal of the kill switch 208 and the cutoff switch 206 between the cutoff switch and the battery relay input 210. In some embodiments, the kill switch 208 may be configured to function as a fail-safe, wherein when the detected operating voltage of an aircraft reaches or exceeds a predetermined kill voltage, the kill switch 208 operates to blow fuse 226 and reconfigure the first battery 104 and the second battery 106 into a parallel connection. In some embodiments of the disclosure, the predetermined kill voltage may be about thirty-four (34) volts as determined by the characteristics of the circuit. In some instances the predetermined kill voltage of the kill switch 208 may be configured according to the voltage sensitivity of various components (e.g. avionics or other instruments). In some embodiments, the predetermined kill voltage may also be configured based on a percentage of a battery voltage (e.g. 150%). In some embodiments of the disclosure, the kill switch 208 may also be coupled to a ground terminal 220 of the battery start controller 110. While a ground terminal 220 is provided in this embodiment, it should be understood that a ground terminal should not be limited to any particular embodiment, and a ground terminal may include a ground plane, direct chassis ground, or any other means of grounding an electrical connection as would be appreciated by one skilled in the art.

It should be noted that in some embodiments, the series connection of the first battery 104 and the second battery 106 may generally supply an operating voltage of about forty-eight (48) volts to an aircraft 100 at engine startup. During engine startup, however, the operating voltage may drop to about twenty (20) volts due to the electrical demands of the engine starter 114. In some embodiments of the disclosure, the relay control switch 204 may be configured to detect an operating voltage of about twenty-nine (29) volts. Thus, as the electrical load required for engine startup decreases, the operating voltage may rise, wherein when the operating voltage reaches the predetermined cutoff voltage (e.g. twenty-nine (29) volts) of the cutoff switch 206, as determined by the characteristics of the circuit, the cutoff switch 206 operates to reconfigure the first battery 104 and the second battery 106 into a parallel connection, wherein a nominal operating voltage of about twenty-eight (28) volts may continue to be supplied to start the aircraft engine 102.

Additionally, it should also be noted that providing a higher operating voltage to an engine 102 during startup may contribute to decreased engine startup time. Generally, an engine must accelerate to a considerable speed before it will operate without the aid of an engine starter 114. However, providing a higher operating voltage to an engine starter 114 through the series configuration of the first battery 104 and the second battery 106 may allow and engine 102 to reach normal operating speeds in a shorter amount of time. In some embodiments of the disclosure, the series configuration of the first battery 104 and the second battery 106 may persist for about ten to fifteen seconds, wherein the first battery 104 and the second battery 106 are reconfigured into a parallel connection, wherein engine startup may persist for about an additional 10-15 seconds. An engine 102 may generally take as long as one minute to fully achieve the speed necessary to run on its own. Thus, in some embodiments of the disclosure, engine startup time may be reduced by about one-third (⅓) of normal engine startup time.

Figure 3:
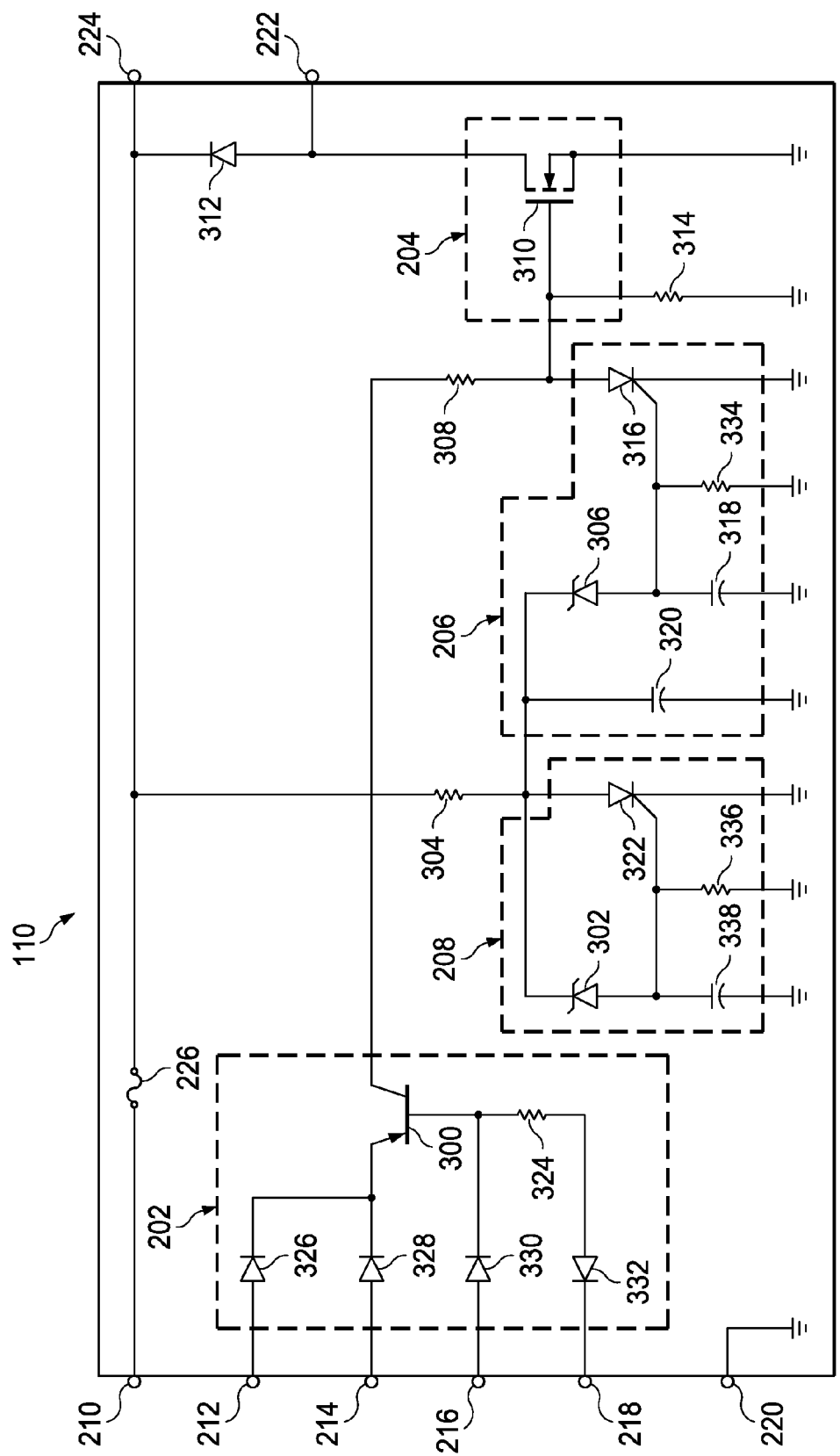
FIG. 3 is a schematic of a series battery start controller according to an embodiment of the disclosure.

Referring now to FIG. 3, a schematic of a battery start controller 110 is shown according to an embodiment of the disclosure. Generally, the battery start controller 110 generally comprises a series switching logic 202, a relay control switch 204, a cutoff switch 206, and a kill switch 208. The battery start controller 110 may also comprise a battery relay input 210 to provide power to the battery start controller 110. The battery start controller 110 may also comprise a battery relay output 224, coupled to the battery relay input 210. In some embodiments of the disclosure, the battery series controller 110 may comprise a fuse 226, wherein the fuse 226 is located between the battery relay input 210 and the battery relay output 224. Generally, the value of the fuse may be chosen based on the characteristics of the circuit. For example, in some embodiments, the fuse may comprise a rating of about 7.5 amperes. Additionally, the battery start controller 110 may also comprise a ground terminal 220. While a ground terminal 220 is provided in some embodiment, it should be understood that a ground terminal 220 should not be limited to any particular embodiment, and a ground terminal may include a ground plane, direct chassis ground, or any other means of grounding an electrical connection as would be appreciated by one skilled in the art.

Still referring to FIG. 3, the series switching logic 202 may generally comprise a resistor 324; diodes 326, 328, 330, and 332; and a transistor 300 having an emitter, a base, and a collector. The emitter of the transistor 300 may generally be coupled to a plurality of engine start inputs. In some embodiments of the disclosure, the emitter of the transistor 300 may be coupled to a first engine start input 212 and a second engine start input 214. In some embodiments of the disclosure, a diode 326 may be located between the first engine input 212 and the emitter of the transistor 300, wherein the first engine start input 212 may be coupled to an anode of the diode 326 and the emitter of the transistor 300 may be coupled to the cathode of the diode 326. It should be noted that the value of the diode 326 may be chosen based on the characteristics of the circuit, wherein in some embodiments, the diode 326 may comprise a 1N914 diode. In some embodiments of the disclosure, a diode 328 may be located between the second engine input 214 and the emitter of the transistor 300, wherein the second engine start input 214 may be coupled to an anode of the diode 328 and the emitter of the transistor 300 may be coupled to the cathode of the diode 328. The value of the diode 328 may generally be chosen based on characteristics of the circuit. However, in some embodiments, the diode 328 may comprise a 1N914 diode.

The base of the transistor 300 of the series switching logic 202 may also be coupled to a plurality of inputs. In some embodiments of the disclosure, a diode 330 may be coupled between the generator input 216 and the base of the transistor 300, wherein the generator input 216 may be coupled to an anode of the diode 330 and the base of the transistor 300 may be coupled to a cathode of the diode 330. The base of the transistor 300 may also be coupled to an external power input 218. In some embodiments, the external power input 218 may be coupled to a cathode of a diode 332, wherein an anode of the diode 332 may be coupled to a first terminal of the resistor 324 of the series switching logic 20 and a second terminal of the resistor 324 may be coupled to the base of the transistor 300 of the series switching logic 202. The values of the diode 330 and the diode 332 may generally be chosen based on characteristics of the circuit. However, in some embodiments, the diode 330 and the diode 332 may comprise 1N914 diodes.

The collector of the transistor 300 of the series switching logic 202 may generally be coupled to the relay control switch 204 and the cutoff switch 206 through a resistor 308, wherein the collector of the transistor 300 may be connected to a first terminal of the resistor 308. It should be noted that the value of the transistor 300 may generally be chosen based on the characteristics of the circuit. In some embodiments of the disclosure the transistor 300 of the series switching logic 202 may comprise a bipolar junction transistor. For example, in some embodiments, the transistor 300 may comprise a 2N2907 bipolar junction transistor. The value of resistor 324 may also be chosen based on the characteristics of the circuit. In some embodiments of the disclosure, the resistor 324 may comprise a 27,000 ohm or twenty-seven kiloohm (27 kΩ) resistor.

Still referring to FIG. 3, the relay control switch 204 may generally comprise a transistor 310, wherein the transistor 310 generally comprises three terminals: a gate, a drain, and a source. In some embodiments, the gate of the transistor 310 may be coupled to a second terminal of the resistor 308, wherein the first terminal of the resistor 308 may be coupled to the collector of the transistor 300 of the series switching logic 202. The value of the resistor 308 may generally be chosen based on the characteristics in the circuit. In some embodiments, the resistor 308 may comprise a ½ Watt, 7,000 ohm or seven kiloohm (7 kΩ) resistance value resistor. In some embodiments of the disclosure, the gate of the transistor 310 may also be coupled to a first terminal of a resistor 314, wherein a second terminal of the resistor 314 may be coupled to the ground terminal 220. It should be noted that the resistor 314 value may be chosen based on the characteristics of the circuit. In some embodiments, the resistor 314 may comprise a 10,000 ohm or ten kiloohm (10 kΩ) resistor. Furthermore, the gate of the transistor 310 may also be coupled to the cutoff switch 206. The source of the transistor 310 of the relay control switch 204 may generally be connected to the ground terminal 220. The drain of the transistor 310 may generally couple to the series-parallel relay output 222. In some embodiments, the drain may also be connected to an anode of a diode 312, wherein the cathode of the diode 312 may generally be coupled to a terminal located between the fuse 226 and the battery relay output 224. The diode 312 may be selected based on the characteristics of the circuit, wherein in some embodiments, the diode 312 may comprise a 1N4001 diode. It should be noted that the value of the transistor 310 may generally be chosen based on the characteristics of the circuit. In some embodiments of the disclosure, the transistor 310 of the series switching logic 202 may comprise a Transistor N Channel Power MOSFET. For example, in some embodiments, the transistor 310 may comprise an IRFZ24N transistor.

Still referring to FIG. 3, the cutoff switch 206 may generally comprise a silicon-controlled rectifier 316, a resistor 334, a capacitor 318, a capacitor 320, and a voltage reference diode 306. The silicon-controlled rectifier 316 may generally comprise an anode, a cathode, and a gate. In some embodiments, the anode of the silicon-controlled rectifier 316 may generally couple to the second terminal of the resistor 308 and to the gate of the transistor 310 of the relay control switch 204, whereas the cathode of the silicon-controlled rectifier 316 may generally be coupled directly to the ground terminal 220. The gate of the silicon-controlled rectifier 316 may comprise a plurality of connections. In some embodiments, the gate of the silicon-controlled rectifier 316 may be coupled to a positive terminal of the capacitor 318, wherein a negative terminal of the capacitor 318 may be coupled to the common ground 220. It should be noted that the capacitor 318 may be chosen based on the characteristics of the circuit, wherein in some embodiments, the capacitor 318 may comprise a 0.1 microfarad capacitor. In some embodiments of the disclosure, the gate of the silicon-controlled rectifier 316 may also be coupled to a first terminal of the resistor 334, wherein a second terminal of the resistor 334 may be coupled to the ground terminal 220, and wherein the resistor 334 and the capacitor 318 are configured in a parallel connection between the gate of the silicon-controlled rectifier 316 and the common ground 220. It should also be noted that the resistor 334 value may be chosen based on the characteristics of the circuit. In some embodiments, the resistor 334 may comprise a 10,000 ohm or ten kiloohm (10 kΩ) resistor. The silicon-controlled rectifier 316 may also be generally referred to as a sensitive gate thyristor, which may generally be chosen based on the characteristics of the circuit. In some embodiments of the disclosure, the silicon-controlled rectifier 316 may comprise a 2N5064 silicon-controlled rectifier.

The cutoff switch 206 may also comprise a voltage reference diode 306 comprising an anode and a cathode. In some embodiments, the anode of the voltage reference diode 306 may generally be coupled to the gate of the silicon-controlled rectifier 316 at a terminal between the positive terminal of the capacitor 318 and the first terminal of the resistor 334. The cathode of the voltage reference diode 306 generally may be coupled to a positive terminal of a capacitor 320, wherein the negative terminal of the capacitor 320 may be coupled to the ground terminal 320. It should be noted that the capacitor 320 may be chosen based on the characteristics of the circuit, wherein in some embodiments, the capacitor 320 may comprise a 22 microfarad capacitor. In order to receive a voltage reading, the anode of the voltage reference diode 306 may also be coupled to a first terminal of a resistor 304, wherein a second terminal of resistor 304 may generally be coupled to a terminal located between the fuse 226 and the battery relay output 224. The resistor 304 may be selected based on the characteristics of the circuit, wherein in some embodiments, the resistor 304 may comprise a ½ Watt, 0.1 Ohm resistor. The voltage reference diode 306 may also be generally referred to as a Zener diode, which one skilled in the art would appreciate as having similar characteristics and performing similar functions. Thus, the disclosure should not be limited to any one embodiment, and should include all equivalent components, chosen based on the characteristics of the circuit. However, in some embodiments of the disclosure, the voltage reference diode 306 may comprise a 1N5255 (28 Volts, ½ Watt) voltage reference diode.

Still referring to FIG. 3, the kill switch 208 may generally comprise a silicon-controlled rectifier 322, a resistor 336, a capacitor 338, and a voltage reference diode 302. The silicon-controlled rectifier 322 may generally comprise an anode, a cathode, and a gate. In some embodiments of the disclosure, the anode of the silicon-controlled rectifier 322 may generally be coupled to the first terminal of the resistor 304, whereas the cathode of the silicon-controlled rectifier 322 may generally be coupled to the ground terminal 220. The gate of the silicon-controlled rectifier 322 may comprise a plurality of connections. In some embodiments, the gate of the silicon-controlled rectifier 322 may be coupled to a positive terminal of the capacitor 338, wherein a negative terminal of the capacitor 318 may be coupled to the common ground 220. It should be noted that the capacitor 338 may be chosen based on the characteristics of the circuit, wherein in some embodiments, the capacitor 318 may comprise a 0.1 microfarad capacitor. In some embodiments of the disclosure, the gate of the silicon-controlled rectifier 322 may also be coupled to a first terminal of the resistor 336, wherein a second terminal of the resistor 336 may be coupled to the ground terminal 220, and wherein the resistor 336 and the capacitor 338 are configured in a parallel connection between the gate of the silicon-controlled rectifier 322 and the common ground 220. It should also be noted that the resistor 336 value may be chosen based on the characteristics of the circuit. In some embodiments, the resistor 336 may comprise a 10,000 ohm or ten kiloohm (10 kΩ) resistor. The silicon-controlled rectifier 322 may also be generally referred to as a sensitive gate thyristor, which may generally be chosen based on the characteristics of the circuit. In some embodiments of the disclosure, the silicon-controlled rectifier 322 may comprise an S2015L silicon-controlled rectifier.

The kill switch 208 may also comprise a voltage reference diode 302 comprising an anode and a cathode. In some embodiments, the anode of the voltage reference diode 302 may generally be coupled to the gate of the silicon-controlled rectifier 322 at a terminal between the positive terminal of the capacitor 338 and the first terminal of the resistor 336. In some embodiments, the anode of the voltage reference diode 302 may be coupled to a first terminal of the resistor 304. The voltage reference diode 302 may also be generally referred to as a Zener diode, which one skilled in the art would appreciate as having similar characteristics and performing similar functions. Thus, the disclosure should not be limited to any one embodiment, and should include all equivalent components, chosen based on the characteristics of the circuit. However, in some embodiments of the disclosure, the voltage reference diode 302 may comprise a 1N5257 (33 Volts, ½ Watt) voltage reference diode.

Figure 4:
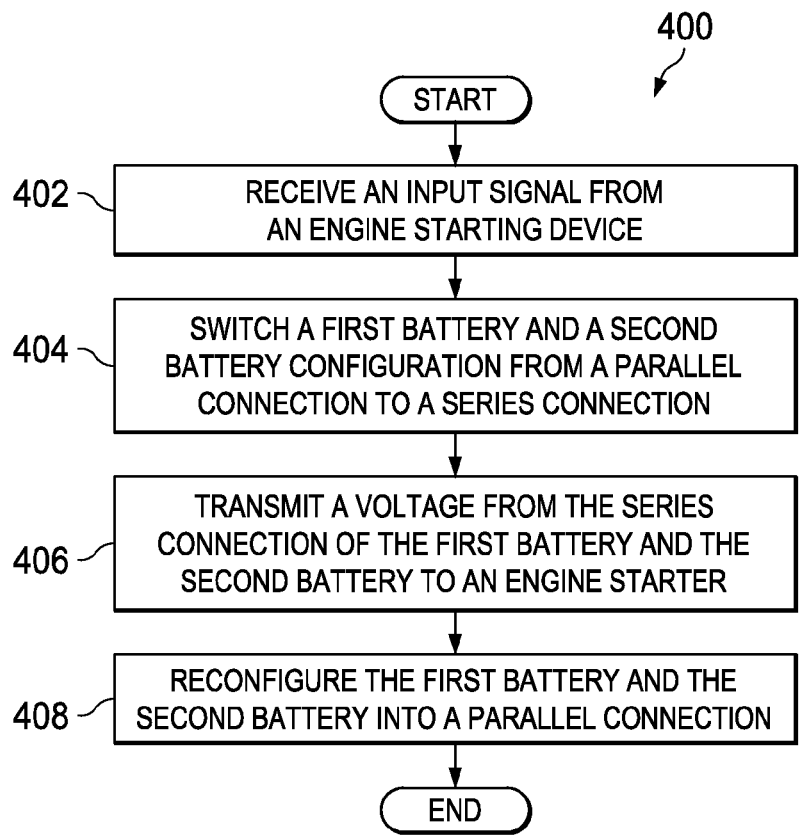
FIG. 4 is a flowchart of a method of starting an engine according to an embodiment of the disclosure.

Referring now to FIG. 4, a flowchart of a method 400 of starting an engine is disclosed according to an embodiment of the disclosure. The method 400 may begin at block 402 by receiving an input signal from an engine starting device. The method 400 may continue at block 404 by switching a first battery and a second battery configuration from a parallel connection to a series connection. The method 400 may continue at block 406 by transmitting a voltage from the series connection of the first battery and the second battery to an engine starter. The method 400 may conclude at block 408 by reconfiguring the first battery and the second battery into a parallel connection when the operating voltage reaches a predetermined cutoff voltage.

Figure 5:
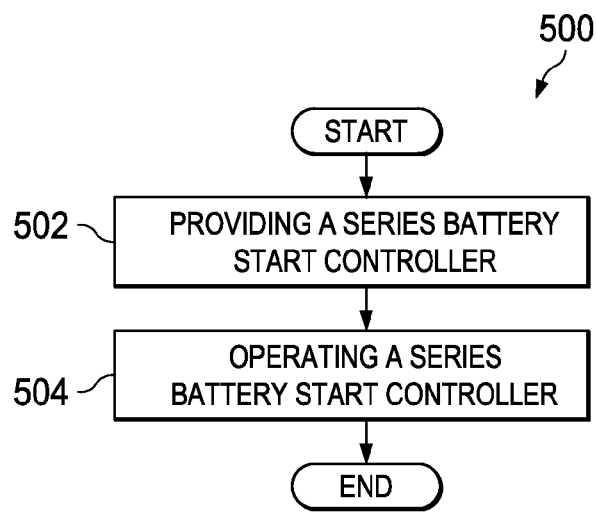
FIG. 5 is a flowchart of a method of providing a series battery start controller according to an embodiment of the disclosure.

Referring now to FIG. 5, a method 500 of providing a series start battery controller is disclosed according to an embodiment of the disclosure. The method 500 may begin at block 502 by providing a series start battery controller. In some embodiments of the disclosure, providing the series start battery controller may comprise designing a series start battery controller, manufacturing a series start battery controller, and/or assembling a series start battery controller. The method 500 may conclude at block 504 by operating a series start battery controller.

As used herein, the term "terminal" may refer to a conductive lead or wire, a conductive post, a conductive bump, a conductive ring, a plug, a conductive rod, a conductive fitting, pin, prong, bolt, stud, clip, tab, threaded hole, braid ending, brush, or any other conductive extension or receptacle. As such, a terminal may conceptually represent electrically connected and/or equivalent component parts that are formed as integrated units. For example, it is possible to form a capacitor, resistor, and inductor from wire or on a circuit board from metal traces, and in some cases, a terminal may refer to an arbitrary point along a wire or metal trace connecting electrical components. A terminal may also be considered to be synonymous with a node, connection, junction, and/or a trace. While a terminal may be metallic, a terminal may be formed of any conductive or semi-conductive material.

While the terms "base", "emitter", and "collector" have been used to describe the terminals of transistors which in some embodiments may be bipolar transistors, other transistor technologies may be used, such as MOSFET, JFET, CMOS, or any other suitable transistor type. Furthermore, different transistors may have different names, such as gate, source, and drain, which designate functions similar to bipolar transistors, as will be appreciated by persons skilled in the art.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An apparatus, comprising:
   a series switching logic;
   a relay control switch electrically coupled to the series switching logic;
   a series-parallel relay electrically coupled to the relay control switch, wherein the series-parallel relay is configured to selectively configure a plurality of batteries between a series and parallel connection; and
   a cutoff switch, wherein the cutoff switch is electrically coupled to the relay control switch and series switching logic, and wherein the cutoff switch is electrically coupled to a battery relay input.

2. The apparatus of claim 1, further comprising a kill switch, wherein the kill switch is electrically coupled to the cutoff switch and the battery relay input.

3. The apparatus of claim 1, wherein the series switching logic comprises a bipolar junction transistor, wherein an emitter of the bipolar junction transistor is electrically coupled to an engine start input, wherein a base of the bipolar junction transistor is electrically coupled to an external power input, and wherein a collector of the bipolar junction transistor is electrically coupled to a first terminal of a first resistor.

4. The apparatus of claim 1, wherein the series switching logic comprises a bipolar junction transistor, wherein an emitter of the bipolar junction transistor is electrically coupled to an engine start input, wherein a base of the bipolar junction transistor is electrically coupled to a generator input, and wherein a collector of the bipolar junction transistor is electrically coupled to a first terminal of a first resistor.

5. The apparatus of claim 1, wherein the relay control switch comprises a transistor, wherein a gate of the transistor is electrically coupled to a second terminal of the first resistor, wherein a source of the transistor is electrically coupled to a common ground, and wherein a drain of the transistor is electrically coupled to the series-parallel relay.

6. The apparatus of claim 1, wherein the cutoff switch comprises a first silicon-controlled rectifier and a first voltage reference diode, wherein an anode of the first silicon-controlled rectifier is electrically coupled to the second terminal of the first resistor, wherein a cathode of the first silicon-controlled rectifier is electrically coupled to the common ground, wherein a gate of the first silicon-controlled rectifier is electrically coupled to an anode of the first voltage reference diode, to common ground through a second resistor, and to common ground through a first capacitor, and wherein an anode of the first voltage reference diode is electrically coupled to the battery relay input.

7. The apparatus of claim 2, wherein the kill switch comprises a second silicon-controlled rectifier and a second voltage reference diode, wherein an anode of the second silicon-controlled rectifier is electrically coupled to battery relay input through a third resistor, wherein a cathode of the second silicon-controlled rectifier is electrically coupled to the common ground, wherein a gate of the second silicon-controlled rectifier is electrically coupled to an anode of the second voltage reference diode, to common ground through a fourth resistor, and to common ground through a second capacitor, and wherein an anode of the second voltage reference diode is electrically coupled to the anode of the second silicon-controlled rectifier.

8. The apparatus of claim 1, further comprising a fuselage and an engine, wherein the plurality of batteries are electrically coupled to the fuselage and the engine.

9. An apparatus, comprising:
   a series switching logic configured to receive an input signal, wherein when the series switching logic receives the input signal, the series switching logic transmits an output signal;
   a relay control switch configured to receive the output signal from the series switching logic and configured to activate a series-parallel relay, wherein when the output signal from the series switching logic is received, the relay control switch activates the series-parallel relay that configures a first battery and a second battery into a series connection; and
   a cutoff switch configured to detect an operating voltage, wherein when the operating voltage reaches a predetermined cutoff voltage, the cutoff switch terminates the output signal from the series switching logic and the first battery and the second battery are then reconfigured into a parallel connection.

10. The apparatus of claim 9, wherein the series switching logic is further configured to detect an external power source, wherein the series switching logic will not transmit the output signal to the relay control switch when the external power source is detected.

11. The apparatus of claim 9, wherein the series switching logic is further configured to detect an on-board generator, wherein the series switching logic will not transmit the output signal to the relay control switch when the on-board generator is detected.

12. The apparatus of claim 9, further comprising a kill switch, wherein the kill switch is configured to detect an operating voltage, wherein when the operating voltage reaches a predetermined kill voltage, the kill switch prevents the series switching logic from transmitting the output signal, thereby configuring the first battery and the second battery into the parallel connection.

13. The apparatus of claim 12, wherein the predetermined cutoff voltage is about twenty-nine volts and the predetermined kill voltage is about thirty-four volts.

14. The apparatus of claim 9, wherein the input signal is an aircraft engine start signal.

15. The apparatus of claim 9, wherein the input signal is a turbine engine start signal.

16. A method of starting an engine, comprising:
receiving an input signal from an engine starting device;
switching a first battery and a second battery configuration from a parallel connection to a series connection;
transmitting a voltage from the series connection of the first battery and the second battery to an engine starter;
detecting an on-board generator; and
returning the first battery and the second battery configuration back to the parallel connection when the on-board generator is detected.

17. The method of claim 16, further comprising:
detecting an operating voltage; and
returning the first battery and the second battery configuration back to the parallel connection when the operating voltage reaches a predetermined cutoff voltage.

18. The method of claim 16, further comprising:
detecting an operating voltage; and
returning the first battery and the second battery configuration back to the parallel connection when the operating voltage reaches a predetermined kill voltage.

19. The method of claim 16, further comprising:
detecting an external power source; and
returning the first battery and the second battery configuration back to the parallel connection when the external power source is detected.

20. The method of claim 18, wherein the predetermined kill voltage is about thirty-four volts.

21. The method of claim 16, wherein the engine starting device is an aircraft engine starting device.

22. The method of claim 17, wherein the predetermined cutoff voltage is about twenty-nine volts.

\* \* \* \* \*